United States Patent [19]

Lindeboom

[11] 3,751,045

[45] Aug. 7, 1973

[54] FLUID SEAL

[75] Inventor: Herman Lindeboom, Pennington, N.J.

[73] Assignee: Ingersoll-Rand Company, New York, N.Y.

[22] Filed: Mar. 19, 1970

[21] Appl. No.: 21,164

[52] U.S. Cl. .................................. 277/27, 277/96
[51] Int. Cl. ............................................. F16j 15/34
[58] Field of Search .................. 277/3, 27, 96, 74, 277/73, 75, 61, 65, 81, 71, 15, 16, 22, 25; 418/170

[56] References Cited
UNITED STATES PATENTS

| | | | |
|---|---|---|---|
| 3,421,768 | 1/1969 | Ludwig | 277/74 |
| 2,265,953 | 12/1941 | Mortensen et al. | 277/74 |
| 3,033,577 | 5/1962 | Spiess | 277/3 |
| 3,093,382 | 6/1963 | Macks | 277/27 |
| 3,499,653 | 3/1970 | Gardner | 277/27 |
| 3,606,349 | 9/1971 | Petrie et al. | 277/27 |
| 3,608,910 | 9/1971 | Tyler | 277/25 |
| 3,623,736 | 11/1971 | Petrie et al. | 277/27 |

FOREIGN PATENTS OR APPLICATIONS

| | | | |
|---|---|---|---|
| 157,116 | 9/1932 | Switzerland | 277/96 |
| 945,265 | 12/1963 | Great Britain | 277/96 |

*Primary Examiner*—Houston S. Bell, Jr.
*Attorney*—Carl R. Horten, David W. Tibbott and Frank S. Troidl

[57] ABSTRACT

This is an improved straight leakoff seal. A differential pressure is maintained in the space between a first sealing member such as a collar on a rotatable shaft and an axially movable second seal member. An annular dam on the second seal member located adjacent the high-pressure end of the space between the two seal members is provided with a plurality of grooves equally spaced circumferentially. The new seal may be used for sealing gas or liquid.

5 Claims, 9 Drawing Figures

PATENTED AUG 7 1973 3,751,045

INVENTOR
*HERMAN LINDEBOOM*
BY
*Frank S. Troidl*
ATTORNEY

INVENTOR
HERMAN LINDEBOOM
BY
Frank S. Troidl
ATTORNEY

FLUID SEAL

This invention relates to fluid seals. More particularly, this invention is a new and improved fluid seal for use with either a gas or liquid system wherein the seal members are kept slightly separated.

In one type of currently used seal, called a leakoff seal, the medium to be sealed flows through the clearance formed by the separation of the seal members. The mating force of one of the seals includes a recessed portion. The shape of the mating face is such that the space between the two seals adjacent such recessed portion is "restrictive"—i.e., a differential pressure is created. The mating face may also include sealing dams. In such case, the spaces between the two seals adjacent the sealing dams are more restrictive than the space adjacent the recessed portion. The total differential pressure across the space between the two seals controls the pressure profile across the seal faces and will determine the operating clearance.

My invention is an improved leakoff seal. Briefly, an axially movable seal member is mounted within the housing and kept slightly separated from another movable seal member so as to maintain a slight gap between the two seal members. The axially movable seal member is provided with a mating face and a rear face. A secondary sealing member is so located between the inside of the housing and this seal member that at least a portion of the rear face is subjected to external fluid pressure. Two dams are provided on the mating face of the axially movable seal member, thus providing a recessed portion between the dams. A plurality of connect extend entirely through the dam located adjacent the high-pressure end of the gap between the two seal members and connected the space adjacent the recessed portion to the external fluid pressure.

Though described herein as being applied to rotating equipment, the new seal can also be used with reciprocating equipment or any other type of equipment for sealing fluids, both liquids and gases.

The invention, as well as its many advantages, may be further understood by reference to the following detailed description and drawings in which.

Like parts throughout the various views are referred to by like numbers.

Figure 1:
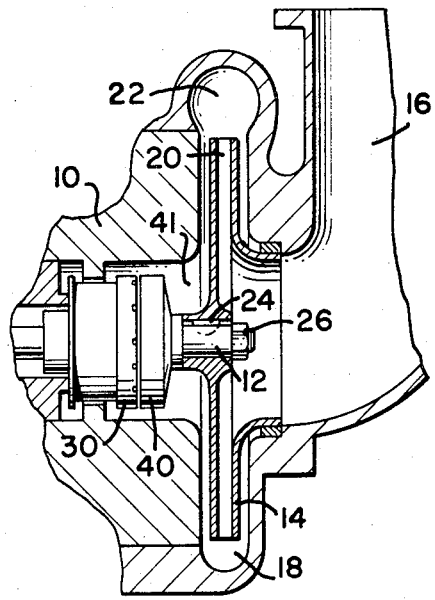
FIG. 1 is a fragmentary elevational view, partly in section, showing the use of my new seal in a centrifugal pump.

Referring to the drawings and particularly to FIG. 1, my new seal is illustrated as used as a straight leakoff seal in a fluid pump. A housing 10 is shown in which is installed a drive shaft 12. Assembled on the rotatable shaft 12 is an impeller 14. An intake throat or conduit 16 is formed on housing 10 and opens coaxially into the side of the impeller chamber 18. Impeller 14 mounted within impeller chamber 18 has formed therein a plurality of spoke-like, radially extending passages 20 which open axially at their inner ends to intake conduit 16, and open radially at their outer ends to the discharge chamber 22, as is common in centrifugal pumps of this type.

A long key 24 drivingly connects impeller 14 to the shaft, and a nut 26, threaded on the end of the shaft, clamps the impeller axially to the shaft.

Figure 5:
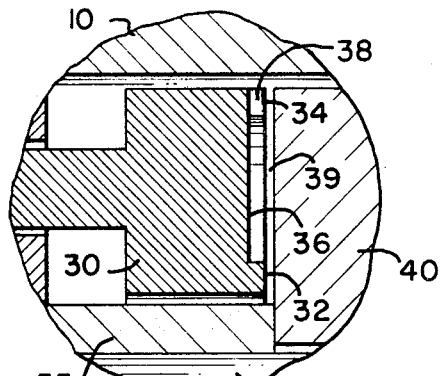
FIG. 5 is a fragmentary view on an enlarged scale, partly in section, showing the structure of the axially movable sealing member.

In accordance with my invention, a sealing ring 30 having a special shape and special dimensions is mounted within housing 10. The mating face of sealing ring 30 is provided with an inner annular dam 32 (see FIG. 5) and an outer annular dam 34, thus providing an annular recess 36 separating the inner and outer dams.

A plurality of grooves 38 extend through dam 34 to the space 39 between the sealing ring and the collar 40 adjacent annular recess 36. Fluid entering the housing through fluid inlet 41 flows through the gap between collar 40 and sealing ring 30. Grooves 38 are circumferentially equally spaced and are at an angle with respect to the radius of the sealing ring.

An O-ring 42 located in the recess 43 provides a secondary seal between an inwardly extending annular member 44 of housing 10 and sealing ring 30. The dowel pins 46 extend through the washer 48, which, in turn, is connected to sealing ring 30 by the threaded screws 50. The coil springs 52 positioned within the recesses 54 of housing 10 fit about one end of dowel pins 46 and operate against washer 48 to provide a normally open seal. If desired, the structure could be easily modified, for example, by placing the coil springs about the opposite ends of the dowel pins to provide a normally closed seal.

Figure 2:
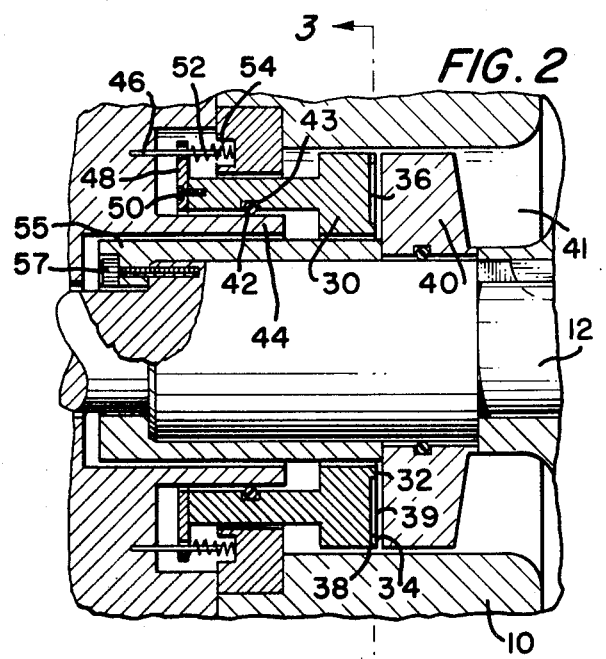
FIG. 2 is an elevational view, partly in section, on an enlarged scale showing the seal members of FIG. 1.

The biasing force of coil springs 52 is just enough to overcome the friction of O-ring 42 at zero pressure differential. The mating face area of sealing ring 30 and the rear face area of the sealing ring are such that under pressure the balance of pressure forces acting on the mating face and the rear face of the sealing ring keeps a positive clearance between collar 40 and sealing ring 30. A small amount of the fluid to be sealed flows inwardly between the sealing faces of collar 40 and sealing ring 30 from the high-pressure region, which, in FIG. 2, is the region on the outer edge of sealing ring 30 to the low-pressure region between the seal spacer 55 connected to shaft 12 by the screws 57 and the inner edge of sealing ring 30.

Figure 6:
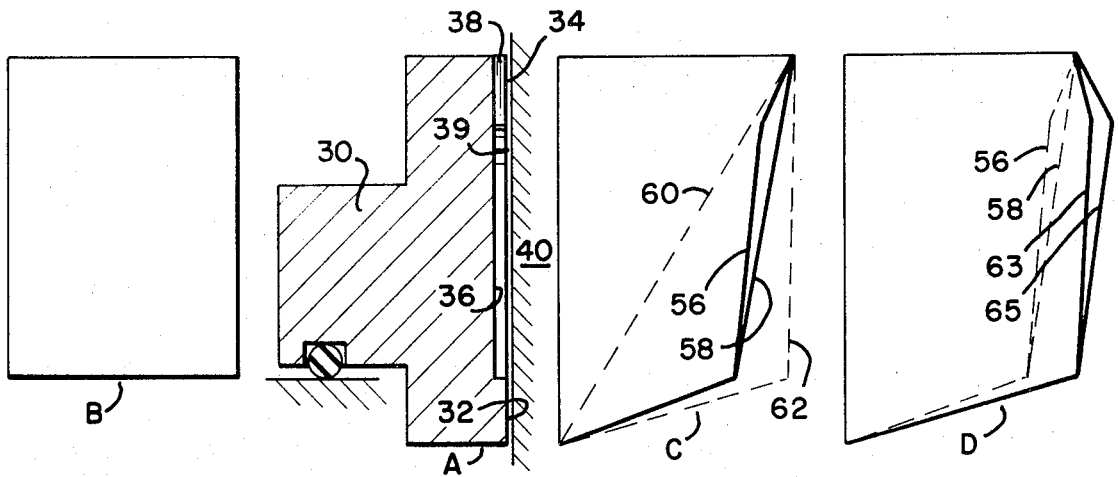
FIG. 6 is a schematic diagram useful in explaining the advantages of my new invention.

FIG. 6 is a schematic diagram showing the pressure profiles between the sealing faces useful in explaining the advantages of my new invention. The pressure profiles for equilibrium of the sealing ring are shown by B and C in FIG. 6. The pressure profiles across the sealing face are drawn as straight lines for simplicity, but are actually slightly curved lines. A represents sealing ring 30 and collar 40. B shows the pressure profile acting on the back of the sealing ring. C shows the pressure profile acting on the mating faces of the sealing ring and the collar. The area enclosed by the pressure profiles represents the force acting on the sealing ring per unit circumference. Hence, for equilibrium the enclosed area of B equals the enclosed area of a line which is an average of lines 56 and 58 plus the other lines shown in C.

Lines 56 and 58 represent the pressure profile for hydrostatic equilibrium between the grooves 38 and across the grooves, respectively. Broken lines 60 and 62 are pressure profiles for extreme positions of the sealing ring. The area between the average of lines 56 and 58 and line 62 represents the maximum restoring force to prevent the seal from closing. Line 60 is obtained by applying an external force to the sealing ring tending to open the sealing ring. The average of curves 63 and 65 represents the maximum restoring force to prevent the seal from closing under dynamic running conditions. This force is generated by the inward pumping action of grooves 38.

Grooves 38 play an important role in the performance of the seal. Under dynamic conditions, the grooves will pump fluid inward into recessed area 36, causing the front face pressure profile and the front face force to grow, preventing the contact of the seal faces. When the seal faces are in full contact, meaning no flow-through, the grooves will allow the pressure to enter space 39 and build up a pressure profile as shown by line 62. The generated restoring force will separate the seal faces and restore equilibrium. Without groves 38 the system pressure would not be able to penetrate into space 39, and the seal would remain closed. The number of grooves intersecting into recessed area 36 of sealing ring 30 and their angular offset with respect to the center line are also significant, since they largely influence the shape of the pressure profile generated between the sealing faces under static and dynamic conditions. Increasing the number of the grooves will increase the running clearance. Increasing the angular offset with respect to the center line will increase the running clearance under dynamic conditions. The reason is that by increasing the number of grooves, the flow area is increased; and by increasing the angular offset, the pumping action under dynamic conditions is increased. For both conditions the pressure profile of the front face grows larger, which upsets the equilibrium; and to restore equilibrium, the sealing ring has to move farther away from the collar.

As an example, a typical sealing arrangement may have twelve grooves 38, each with a width of .180 inches and a depth of 0.0003 inches to 0.0009 inches. The grooves may be at an angle ranging from 30° to 60° with respect to the radius with a 0.75 inches to 1.5 inches circumferential spacing between the grooves. The spacing between dams 32 or 34 and the collar may be from 0.0001 inches to 0.0003 inches, and the spacing between the recessed portion of sealing ring 30 and the collar may be from 0.0004 inches to 0.0012 inches.

Figure 3:
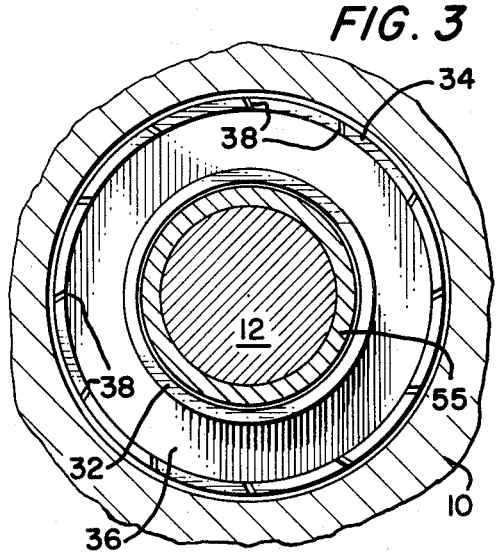
FIG. 3 is a view taken along the lines 3—3 of FIG. 2.
Figure 4:
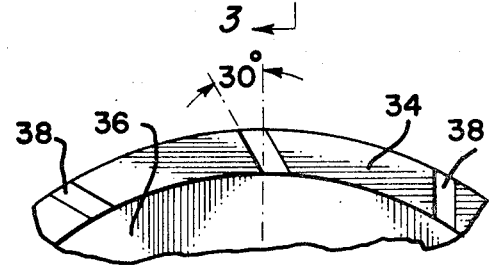
FIG. 4 is a fragmentary view on an enlarged scale showing a portion of FIG. 3.

The direction of rotation of the collar 40 is opposite to the direction of inclination of grooves 38. Thus, looking at FIG. 3, the collar would rotate in a clockwise direction since the grooves are inclined in a counterclockwise direction. A sealing ring 30 having the grooves inclined in the clockwise direction should be used with a counterclockwise rotating collar.

Figure 7:
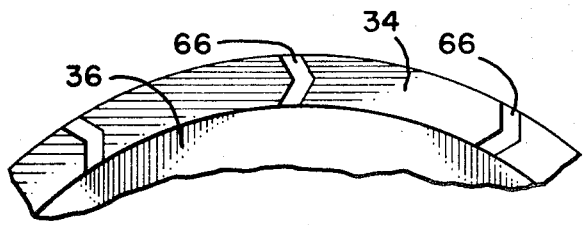
FIG. 7 is a fragmentary view on an enlarged scale showing a modification of the seal.

If desired, the grooves may be made in the shape of a V as shown by V-shaped grooves 66 in the embodiment of FIG. 7. This embodiment may be used with the collar rotation being either clockwise or counterclockwise.

Figure 8:
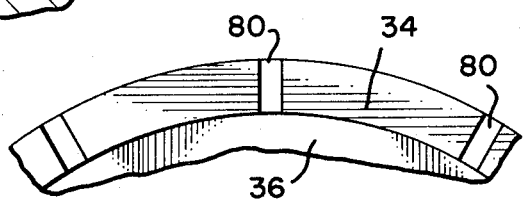
FIG. 8 is a fragmentary view on an enlarged scale showing a further modification of the seal.

For some uses of the seal, the grooves may be in line with the radius of the seal member. This arrangement is shown in FIG. 8 where the grooves 80 in annular dam 34 are in line with the seal member.

The axially movable fluid seal shown in FIGS. 1 through 8 is used as a straight leakoff seal where the higher pressure is along its outer perimeter and the lower pressure is along its inner perimeter. The embodiment shown in FIG. 9 is used where the higher pressure is along the inside perimeter of the axially movable seal and the lower pressure is along the outside perimeter of the seal.

Figure 9:
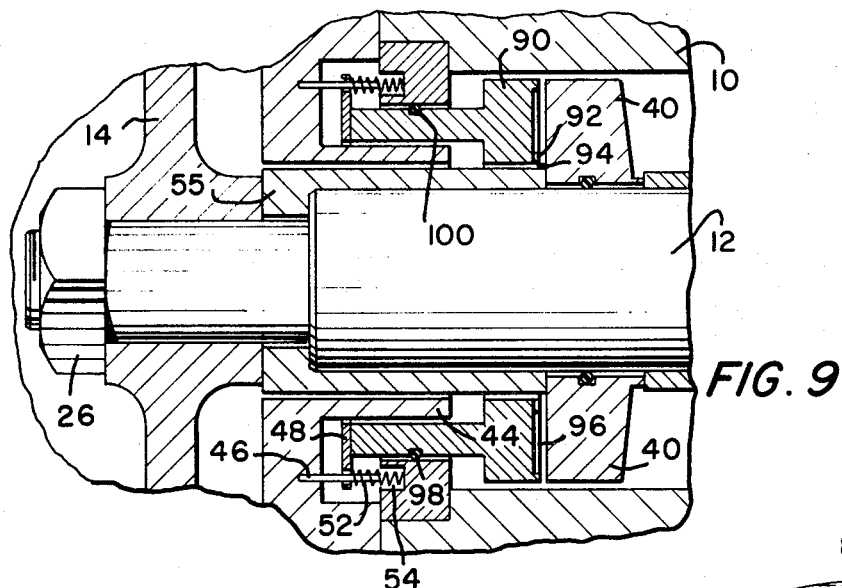
FIG. 9 is a side elevational view, partly in section, showing a further modification of my new seal.

FIG. 9 shows an axially movable annular seal 90 used as a straight leakoff seal. The system pressure from the impeller cavity flows along the outside of the seal spacer 55 and then through the gap between the sealing members.

A plurality of grooves 92 extend through inner annular dam 94 to the space 96 between the sealing ring and the collar adjacent annular recess 97. Fluid from the impeller cavity flows through the gap between collar 40 and sealing ring 90. The grooves are circumferentially equally spaced and may be either inline or at an angle with respect to the radius of the sealing ring.

The O-ring 98 located in the annular groove 100 is located so that the system pressure works against at least a portion of the rear face of annular seal 90.

I claim:

1. In combination with a housing having a fluid inlet, a fluid outlet, a first movable seal member in the housing and located along the fluid path from the fluid inlet to the fluid outlet, wherein the improvement comprises:

a second seal member adapted to be moved toward and away from the first movable seal member and provided with a mating face and a rear face, secondary sealing means located between the housing and the second seal member so that a differential pressure may be created in the space between the first and second seal members and at least a portion of said rear face may be subjected to fluid pressure, said second seal member having a mating face including a pair of dams separated by a recess with one of said dams being located adjacent the high pressure end of the space between the first and second seal members and a plurality of pressure differential controlling grooves having straight sides and constant width and depth extending entirely through the dam adjacent said high pressure end, each of said grooves extending in the same angular direction ranging from 30° to 60° with respect to the radius of the second seal member through at least a part of the dam adjacent the high pressure end.

2. The combination of claim 1 wherein the first movable seal member is a collar mounted on a rotatable shaft, the second seal member is coaxial with said rotatable shaft, the dams are annular dams, and the plurality of grooves are equally spaced circumferentially.

3. The combination of claim 2 wherein each groove is V-shaped.

4. The combination of claim 2 wherein each of the grooves extend entirely through said dam at an angle ranging from 30° to 60° in a clockwise direction with respect to the radius of the second seal member.

5. The combination of claim 2 wherein each of the grooves extend entirely through said dam at an angle ranging from 30° to 60° in a counterclockwise direction with respect to the radius of the second seal member.

* * * * *